Nov. 20, 1962     W. L. CHALFIN     3,064,270

BONING COMPRISING A PLASTIC STRIP

Filed July 5, 1960

*INVENTOR.*
William L. Chalfin
BY
ATTORNEY

United States Patent Office 3,064,270
Patented Nov. 20, 1962

3,064,270
BONING COMPRISING A PLASTIC STRIP
William L. Chalfin, Brooklyn, N.Y., assignor to Wilmington Chemical & Rubber Corporation, Brooklyn, N.Y., a corporation
Filed July 5, 1960, Ser. No. 40,843
2 Claims. (Cl. 2—260)

The present invention relates to a plastic strip, and more particularly to a plastic strip adapted for use as boning.

It is an object of the present invention to provide a plastic strip arranged to hold a reinforcing member.

It is another object of the present invention to provide a boning which will comprise a plastic strip adapted to hold reinforcing members of different stiffness.

It is a further object of the present invention to provide a boning, containing a metal reinforcing member, which may be sewn through for direct application to a garment.

It is yet another object of the present invention to provide a plastic strip, arranged to hold a reinforcing member, which is of a unitary piece of material extruded in a single operation.

Figure 1:
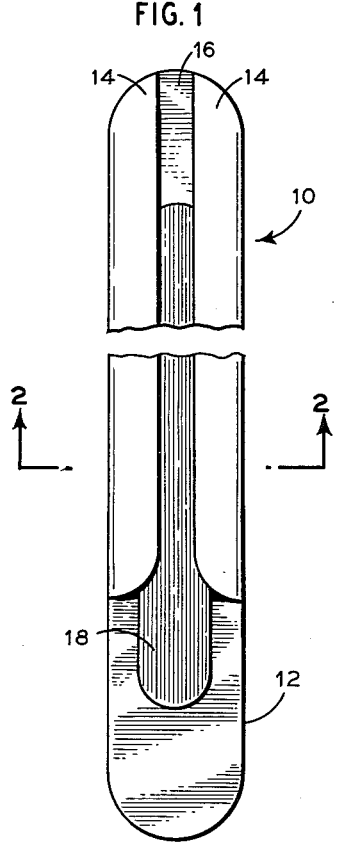
Figure 2:
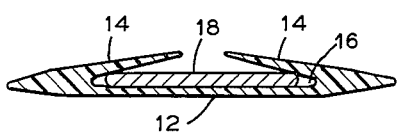

Additional features and advantages of the present invention will be apparent from the following description and drawing in which:

FIG. 1 is a plan view of a boning using the plastic strip of the present invention, partially broken away to show a reinforcing member positioned therein; and FIG. 2 is a cross-sectional view of the boning taken along the line 2—2 of FIG. 1.

In the drawing is shown a boning comprising an elongated plastic strip 10 which has a base portion 12 and a pair of lips 14 that are integral with said base portion and extend inwardly from the edges thereof and substantially parallel therewith. The lips 14 are substantially equal in width and have their edges spaced apart from one another for ease of manipulation. The lips 14 cooperate with the base portion 12 to form a channel 16.

A reinforcing member 18 is positioned within the channel 16. The reinforcing member 18 may be made, for example, of plastic or metal having the desired stiffness. It has been found that stainless steel is a particularly effective material for making the reinforcing member. Regular steel may also be used, in which case it should be treated by lacquering, plating, or phosphating to avoid rusting. The stiffness of the boning may be adjusted by choosing from a group of reinforcing members each having a different degree of resiliency. The stiffness of the boning may be further adjusted by altering the length of the reinforcing member 18.

In practice it has been found convenient to make plastic strips of ½ inch and ¼ inch width which hold ¼ inch and ⅛ inch reinforcing members respectively. It is apparent that the boning thus produced, even while holding a steel reinforcing member, may be secured directly to a garment by stitching right through the side edges of the plastic strip 10 on either side of said reinforcing member 18. In addition, the reinforcing member should be somewhat shorter than the plastic strip so that the boning may be further secured in place by stitching across the ends.

The plastic strip may be produced by a single extrusion operation through a die of suitable shape. Various plastic materials may be used to make the strip including polypropylene and polyvinyl chloride among other polymers or copolymers.

The plastic strip may be extruded in long lengths and rolled up for shipping and storage. The strip may then be cut to desired lengths. Reinforcing members are easily inserted by sliding them into the channel 16. The boning thereby produced is ready for application to the garment.

It has been shown, then, that the present invention provides a plastic strip which is particularly well-suited for use in boning. The strip is arranged to accommodate reinforcing members of different stiffness as desired, and may be sewn directly onto a garment. In addition, the strip, being made of a unitary piece of extruded plastic, is easy and economical to manufacture.

While a specific embodiment of the invention has been shown and described in detail to illustrate the application of the invention, it will be understood that the invention may be embodied otherwise without departing from such principles.

What is claimed is:

1. A plastic strip adapted to hold a reinforcing member, said plastic strip comprising a base portion, and a pair of lips integral with said base portion and extending inwardly from the outer edges of said base portion to form a channel of narrower width than the plastic strip so that the plastic strip may be sewn along the edges thereof for direct application to a garment without such sewing passing through the channel, said lips being substantially equal in width and having their edges spaced apart from one another, said channel being adapted to carry one of several reinforcing members of different stiffness having a width greater than the spacing between the said lips.

2. A boning comprising a plastic strip having a base portion and a pair of lips integral with said base portion and extending inwardly from the outer edges of said base portion substantially parallel therewith to form a channel, said lips being substantially equal in width and having their edges spaced apart from one another, and a metal reinforcing member positioned within said channel, said reinforcing member being of greater width than the spacing between the said lips but of shorter length and narrower width than said plastic strip whereby said boning is adapted to be sewn along the edges and ends thereof for direct application to a garment.

References Cited in the file of this patent

UNITED STATES PATENTS

| | | |
|---|---|---|
| 454,587 | Bray | June 23, 1891 |
| 672,310 | Brown | Apr. 16, 1901 |
| 858,722 | Jordan | July 2, 1907 |
| 2,614,261 | McTighe | Oct. 21, 1952 |
| 2,773,265 | Dick | Dec. 11, 1956 |

FOREIGN PATENTS

| | | |
|---|---|---|
| 791,168 | Great Britain | Feb. 26, 1958 |